Patented July 21, 1931

1,815,739

UNITED STATES PATENT OFFICE

MARVIN C. REYNOLDS AND ALBERT K. EPSTEIN, OF CHICAGO, ILLINOIS

IMPROVED MARGARIN AND PROCESS

No Drawing.    Application filed August 8, 1929.   Serial No. 384,465.

Our invention relates to an improved margarin product and the process for producing the same.

A good grade of margarin should have a fine consistency, smooth texture and should not spatter when heated, as for example in frying. These properties have not been secured commercially to the proper degree by processes heretofore known but the consistency and texture may be improved by the process of our co-pending application Serial No. 475,622, filed Aug. 15, 1930. The imparting of anti-spattering properties to the margarin, however, is a different matter and must be considered in a different way.

It has been known for some time that yolk material may be used with margarin for the purpose of imparting anti-spattering properties thereto and also for improving the texture. In the method used, however, the yolk material was added either by itself or in solution with some sugar, or in solution with some milk but in all cases it was added either to the churn with the ripened milk and oils and fats during the churning process; or it was introduced into the finished solid margarin product by kneading it into the margarin with other ingredients such as salt and preservative. A fair margarin product having anti-spattering properties could be obtained by this method, but it was necessary to introduce such a large percentage of yolk material, namely from 2% to 3% that the cost was prohibitive, and commercially the process could not be used.

The object of the present invention is to produce a margarin having anti-spattering properties more economically than any produced commercially heretofore.

Another object is to obtain the advantage of the introduction of yolk material into the margarin by the use of a considerably smaller percentage of such yolk material.

Another object is to impart anti-spattering properties to margarin by the use of smaller proportions of anti-spattering material than has been possible heretofore.

We have discovered that when yolk material is added to the milk before ripening and the milk ripened in the presence of the yolk material, a substantially smaller amount of yolk material can be used to obtain the desired anti-spattering properties in the finished margarin. In fact we have discovered that if the yolk material is added to the milk before it is inoculated with the culture and before ripening has taken place a quantity as low as .7% of natural yolk material, based upon the total amount of finished margarin will be sufficient to produce optimum anti-spattering results. This has been determined by experiment and we believe that possibly still smaller percentages can be employed satisfactorily, but in no case will a percentage greater than 1% of natural yolk material be necessary for our purpose.

We are aware that anti-spattering compounds such as egg yolk lecithin and vegetable lecithin may be employed in place of the yolk material per se to obtain anti-spattering results, but such materials have also been introduced either into the churn, or into the finished product by kneading. It is within the contemplation of our invention to employ such materials also. We have determined that improved results may be obtained therewith by employing them in accordance with our process, namely to introduce them into the milk before the ripening thereof.

In order to aid those skilled in the art in practising our invention we refer below to one specific manner of carrying it out. Assuming the use of 80 gallons of skim milk, we add thereto before inoculation yolk material which will result in the presence in the finished product of yolk material to the amount of approximately .75%. The yolk material which we prefer to use should be as free of micro-organisms as possible and we prefer the use of egg yolks which have been treated according to one of the processes as set forth in Patents Nos. 1,687,268, 1,687,269 and 1,687,270. The percentage should be calculated on the basis of the actual pure yolk material as it exists in the yolk of eggs and in actual practice we have employed for this purpose a yolk substance which contains approximately 75% of actual pure yolk material. In the process as carried out with 80 gallons of skim milk we employ twenty pounds of such egg product, introducing it into the milk before inoculation thereof with the usual lactic acid producing organism. When ripened the milk is churned with approximately 1600 pounds of suitable fats and oils thereby producing approximately 2000 pounds of margarin. The margarin so produced is formed into prints, etc. in the usual manner.

As stated, the quantity of yolk material should be calculated on the basis of the pure yolk substance present in the product employed. Untreated yolk material can be used but should be very fresh and sterile to avoid the introduction of putrefying organisms which of course are not present in a treated egg yolk product. The amount of actual egg yolk material present in the final margarin product should be from about .6% to 1% with very good commercial results obtainable when the quantity is about .75% as described.

When introducing relatively pure anti-spattering agents such as lecithin it will be necessary to determine the best proportions for the particular character of anti-spattering compound used. In general much better results may be obtained with a smaller percentage of compound when it is introduced before ripening, than will result when using a larger percentage of compound and introducing it at another time or in another manner than herein described.

The product produced by our process has different properties than margarin made in other ways. Undoubtedly this is due to certain physical chemical conditions developed in the substances of the margarin—specifically the milk—and it is assumed that the same condition may possibly be duplicated in other ways. For this reason we claim a new specific product, not dependent necessarily on the use of a particular process—or details of a process—to produce the same.

It may be pointed out also that an anti-spattering agent may also have the properties of a protective colloid when introduced before the milk is ripened, and for this reason may help to improve the texture of the margarin by providing a relatively large number of emulsification nuclei.

For these reasons among others we do not restrict ourselves to the details herein described, but the invention is limited only by the scope of the appended claims.

By the term "non-spattering" margarin as employed in the specification and claims, we refer to a margarin, the spattering behavior of which is substantially reduced so that the resulting product can be used for frying purposes.

What we claim as new and desire to protect by United States Letters Patent is:

1. A process for producing margarin having anti-spattering properties including the step of introducing an anti-spattering agent to unripened milk, and subsequently ripening said milk in the presence of the anti-spattering agent.

2. A process for introducing egg yolk into margarin to impart anti-spattering properties to the margarin which includes introducing suitable egg yolk material into sweet unripened milk, inoculating the milk to ripen it and emulsifying the ripened milk with suitable fats and oils to produce a margarin emulsion.

3. A process for producing margarin which consists of introducing an anti-spattering agent in milk, inoculating the milk with a lactic acid producing organism and subsequently ripening the milk.

4. A process for producing margarin which consists in introducing an anti-spattering agent into milk, adding a lactic acid producing bio-chemical agent thereto to ripen the milk, and churning the ripened milk with suitable fats to produce margarin.

5. A process for producing margarin which consists in adding from one-half to two per cent of an anti-spattering agent to a quantity of milk, subsequently ripening the milk, and churning the ripened milk with suitable fats to produce margarin said percentage of anti-spattering agent being based upon the finished margarin product.

6. A process for producing margarin which consists in adding approximately .75% egg yolk to milk, ripening the milk, and churning the milk with suitable fats to produce margarin said percentage of egg yolk being based on the finished margarin product.

7. As a new article, a substantially non-spattering margarin product having a percentage of egg yolk material not greater than 1%, the anti-spattering properties resulting solely from the presence of the egg yolk.

8. A process for producing margarin having anti-spattering properties, which comprises introducing a relatively small amount of lecithin into unripened milk, subsequently ripening the milk and finally churning the ripened milk with suitable oleaginous material to form a margarin.

9. A process for producing margarin having anti-spattering properties which comprises introducing a relatively small amount of lecithin into unripened milk, subsequently inoculating such milk with a lactic acid producing organism to produce a ripened milk, and finally churning such ripened milk with suitable oleaginous material to form a margarin.

In witness whereof, we hereunto subscribe our names this 17th day of July, 1929.

MARVIN C. REYNOLDS.
ALBERT K. EPSTEIN.